United States Patent
Griffis et al.

(10) Patent No.: US 11,668,242 B2
(45) Date of Patent: Jun. 6, 2023

(54) FUEL INJECTION ASSEMBLY FOR A TURBOMACHINE

(71) Applicant: General Electric Company, Schenectady, NY (US)

(72) Inventors: Clay Thomas Griffis, Greenville, SC (US); Jonathan Dwight Berry, Simpsonville, SC (US); Keith Cletus Belsom, Laurens, SC (US); Heath Michael Ostebee, Easley, SC (US)

(73) Assignee: General Electric Company, Schenectady, NY (US)

( * ) Notice: Subject to any disclaimer, the term of this patent is extended or adjusted under 35 U.S.C. 154(b) by 36 days.

(21) Appl. No.: 17/036,745

(22) Filed: Sep. 29, 2020

(65) Prior Publication Data
US 2022/0099027 A1    Mar. 31, 2022

(51) Int. Cl.
*F02C 7/00* (2006.01)
*F02C 7/22* (2006.01)
*F23D 14/58* (2006.01)
*F23R 3/28* (2006.01)

(52) U.S. Cl.
CPC ............ *F02C 7/222* (2013.01); *F23D 14/583* (2013.01); *F23R 3/28* (2013.01); *F05D 2240/35* (2013.01); *F05D 2250/231* (2013.01)

(58) Field of Classification Search
None
See application file for complete search history.

(56) References Cited

U.S. PATENT DOCUMENTS

| | | | |
|---|---|---|---|
| 2016/0245182 A1* | 8/2016 | Elwasila | F23R 3/34 |
| 2017/0276362 A1* | 9/2017 | Berry | F02C 7/18 |
| 2017/0276366 A1* | 9/2017 | Berry | F23R 3/34 |
| 2017/0299187 A1* | 10/2017 | Berry | F02C 7/18 |
| 2017/0342912 A1 | 11/2017 | Kim et al. | |
| 2018/0209653 A1* | 7/2018 | DiCintio | F02C 3/04 |
| 2018/0245792 A1* | 8/2018 | McMahan | F23R 3/346 |
| 2019/0285368 A1 | 9/2019 | Ranjan et al. | |
| 2020/0018237 A1 | 1/2020 | Ryon et al. | |
| 2021/0025329 A1* | 1/2021 | Ryon | F02M 69/50 |

FOREIGN PATENT DOCUMENTS

JP    S62156287 U    10/1987

OTHER PUBLICATIONS

European Search Report Corresponding to Application No. 21187035 dated Dec. 17, 2021.

* cited by examiner

*Primary Examiner* — Edwin Kang
(74) *Attorney, Agent, or Firm* — Dority & Manning, P.A.

(57) ABSTRACT

Fuel injection assemblies and combustors are provided. A fuel injection assembly includes a fuel injector having a first annular wall that about an axial centerline and extends from a primary inlet disposed at a first end to a primary outlet disposed at a second end. A second annular wall surrounds the first annular wall. A fuel plenum is defined between the first annular wall and the second annular wall. A fuel duct extends from a fuel outlet defined in the second annular wall to a fuel inlet. wherein the fuel duct is in fluid communication with the fuel plenum. The fuel duct includes a polygonal segment and a cylindrical inlet segment. The polygonal segment extends from the fuel outlet to the cylindrical inlet segment.

13 Claims, 10 Drawing Sheets

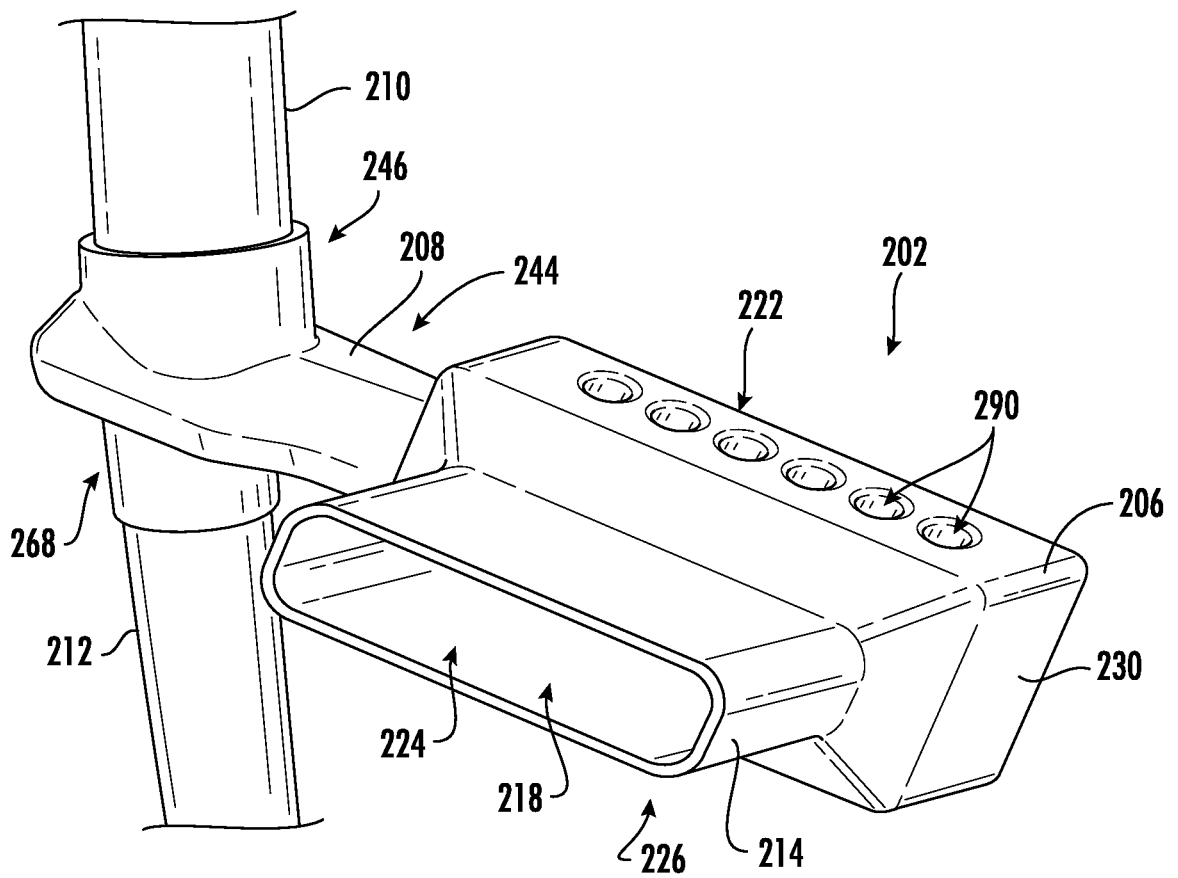
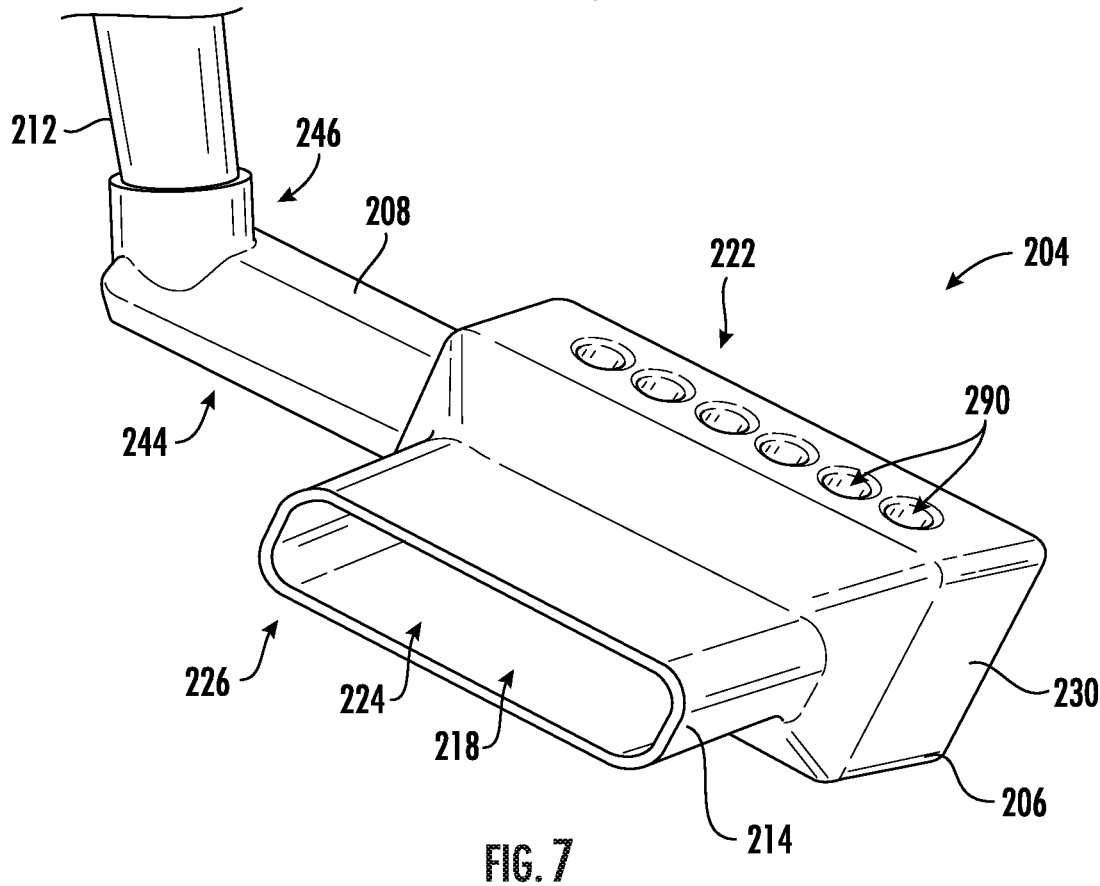
FIG. 7

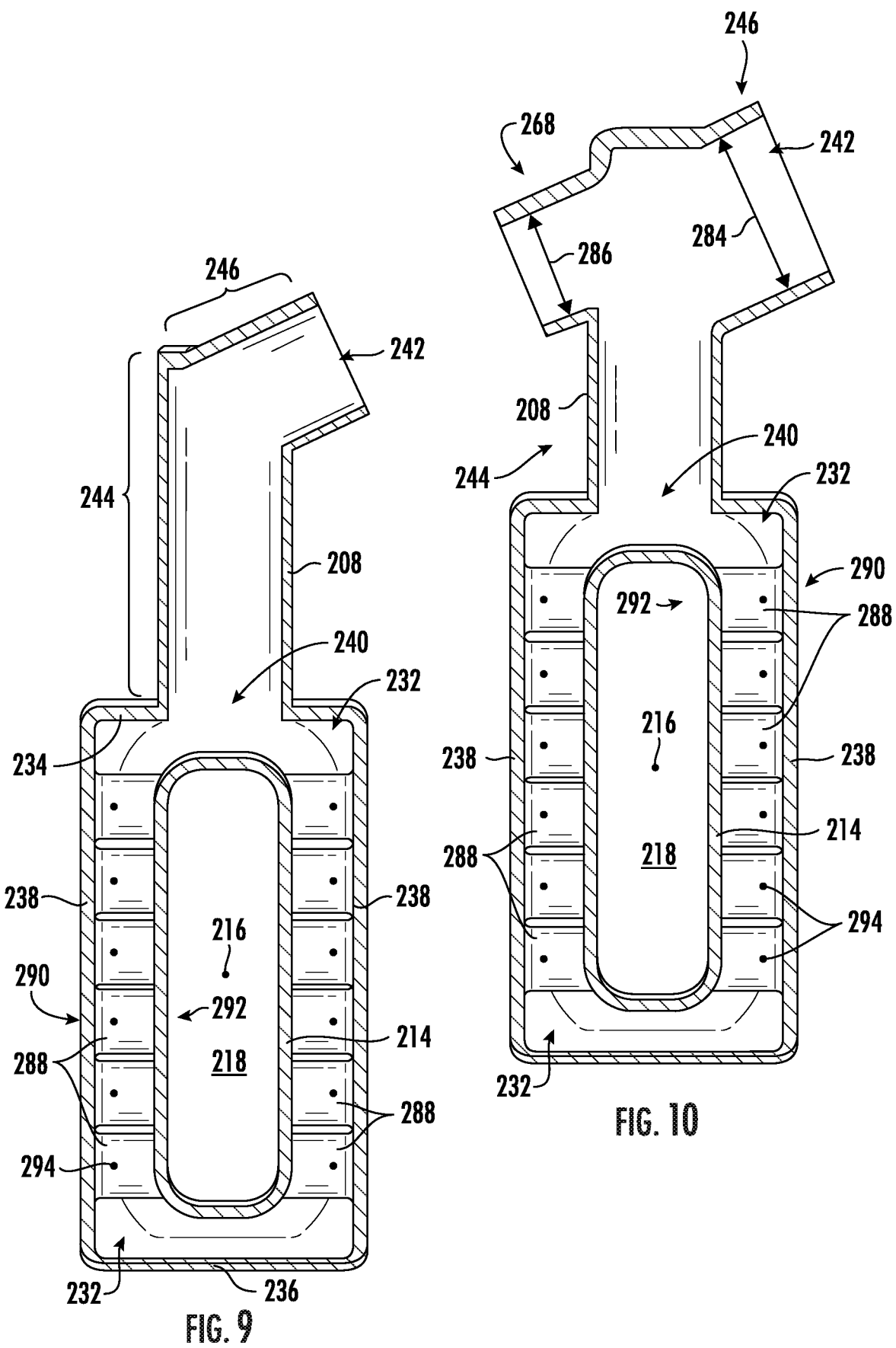

FUEL INJECTION ASSEMBLY FOR A TURBOMACHINE

STATEMENT REGARDING FEDERALLY SPONSORED RESEARCH OR DEVELOPMENT

This invention was made with Government support under Contract No. DE-FE0023965 awarded by the United States Department of Energy. The Government has certain rights in this invention.

FIELD

The present disclosure relates generally to fuel injectors for turbomachine combustors and, more particularly, to fuel injectors for use with an axial fuel staging (AFS) system associated with such combustors.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

In some combustors, the generation of combustion gases occurs at two, axially spaced stages. Such combustors are referred to herein as including an "axial fuel staging" (AFS) system, which delivers fuel and an oxidant to one or more fuel injectors downstream of the head end of the combustor. In a combustor with an AFS system, a primary fuel nozzle at an upstream end of the combustor injects fuel and air (or a fuel/air mixture) in an axial direction into a primary combustion zone, and an AFS fuel injector located at a position downstream of the primary fuel nozzle injects fuel and air (or a second fuel/air mixture) as a cross-flow into a secondary combustion zone downstream of the primary combustion zone.

AFS injectors are often constructed using an additive manufacturing system, which allows for complex structural geometries and internal circuits within the injectors that otherwise would not be possible to produce. However, various features of the AFS fuel injector may be difficult and/or impossible to additively manufacture without utilizing a large number temporary supports. The temporary supports prevent certain features of the fuel injector from collapsing during the additive manufacturing process, but they are often costly and must be removed via a post machining process, which increases the overall production time.

Accordingly, an improved AFS fuel injector having features that minimize the number of temporary supports necessary during fabrication, which thereby reduces the amount of post machining to the fuel injectors, is desired in the art.

BRIEF DESCRIPTION

Aspects and advantages of the fuel injection assemblies and combustors in accordance with the present disclosure will be set forth in part in the following description, or may be obvious from the description, or may be learned through practice of the technology.

In accordance with one embodiment, a fuel injection assembly is provided. The fuel injection assembly includes a fuel injector having a first annular wall that about an axial centerline and extends from a primary inlet disposed at a first end to a primary outlet disposed at a second end. A second annular wall surrounds the first annular wall. A fuel plenum is defined between the first annular wall and the second annular wall. A fuel duct extends from a fuel outlet defined in the second annular wall to a fuel inlet. wherein the fuel duct is in fluid communication with the fuel plenum. The fuel duct includes a polygonal segment and a cylindrical inlet segment. The polygonal segment extends from the fuel outlet to the cylindrical inlet segment.

In accordance with another embodiment, a combustor is provided. The combustor includes a primary fuel nozzle and a combustion liner. The combustion liner extends radially between an inner liner segment and an outer liner segment. The combustion liner includes a forward end portion, an aft end portion, a first side wall, and a second side wall. The combustion liner defines a cavity that extends between the first side wall and the second side wall. The combustor further includes a fuel injection assembly positioned downstream from the primary fuel nozzle. the fuel injection assembly includes a fuel injector having a first annular wall that about an axial centerline and extends from a primary inlet disposed at a first end to a primary outlet disposed at a second end. A second annular wall surrounds the first annular wall. A fuel plenum is defined between the first annular wall and the second annular wall. A fuel duct extends from a fuel outlet defined in the second annular wall to a fuel inlet. wherein the fuel duct is in fluid communication with the fuel plenum. The fuel duct includes a polygonal segment and a cylindrical inlet segment. The polygonal segment extends from the fuel outlet to the cylindrical inlet segment.

These and other features, aspects and advantages of the present fuel injection assemblies and combustors will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present fuel injection assemblies and combustors, including the best mode of making and using the present systems and methods, directed to one of ordinary skill in the art, is set forth in the specification, which makes reference to the appended figures, in which:

FIG. 7 illustrates an enlarged perspective view of a fuel injection assembly, in accordance with embodiments of the present disclosure;

FIG. 9 illustrates a cross-sectional view of the fuel injector, in accordance with embodiments of the present disclosure;

FIG. 10 illustrates a cross-sectional view of the fuel injector, in accordance with embodiments of the present disclosure;

DETAILED DESCRIPTION

Figure 1:
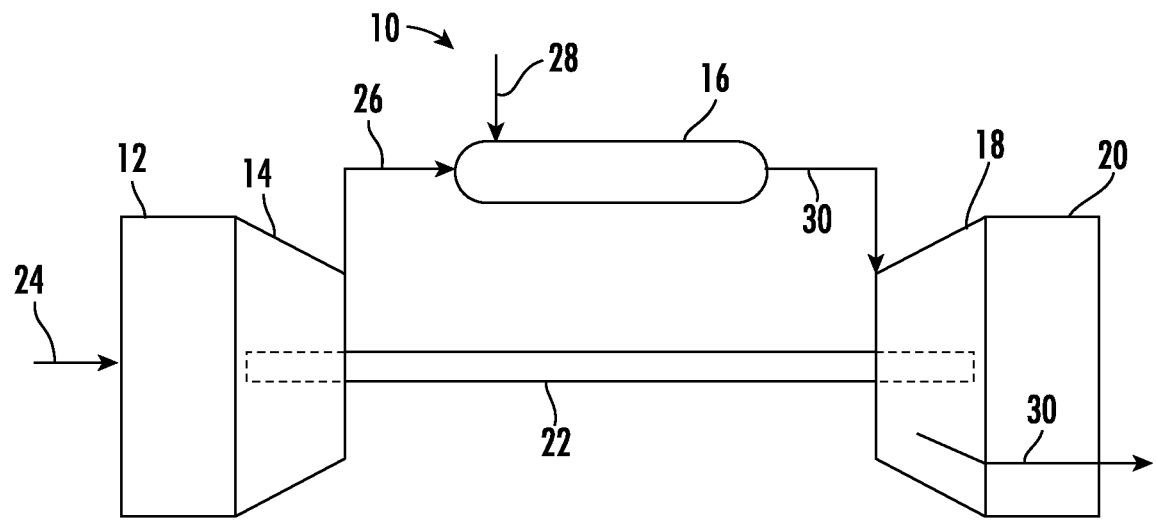
FIG. 1 is a schematic illustration of a turbomachine, in accordance with embodiments of the present disclosure.

Reference now will be made in detail to embodiments of the present assemblies, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component. Terms of approximation, such as "generally," "substantially," "approximately," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As described below, exemplary embodiments of the present subject matter involve the use of additive manufacturing machines or methods. As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components.

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land based and/or industrial gas turbine unless otherwise specified in the claims. For example, the invention as described herein may be used in any type of turbomachine including but not limited to a steam turbine, an aircraft gas turbine, or a marine gas turbine.

As shown, the gas turbine 10 generally includes an inlet section 12, a compressor 14 disposed downstream of the inlet section 12, a combustion section 16 disposed downstream of the compressor 14, a turbine 18 disposed downstream of the combustion section 16, and an exhaust section 20 disposed downstream of the turbine 18. Additionally, the gas turbine 10 may include one or more shafts 22 that couple the compressor 14 to the turbine 18.

During operation, air 24 flows through the inlet section 12 and into the compressor 14 where the air 24 is progressively compressed, thus providing compressed air 26 to the combustion section 16. At least a portion of the compressed air 26 is mixed with a fuel 28 within the combustion section 16 and burned to produce combustion gases 30. The combustion gases 30 flow from the combustion section 16 into the turbine 18, wherein energy (kinetic and/or thermal) is transferred from the combustion gases 30 to rotor blades (not shown), thus causing shaft 22 to rotate. The mechanical rotational energy may then be used for various purposes, such as to power the compressor 14 and/or to generate electricity. The combustion gases 30 exiting the turbine 18 may then be exhausted from the gas turbine 10 via the exhaust section 20.

Figure 2:
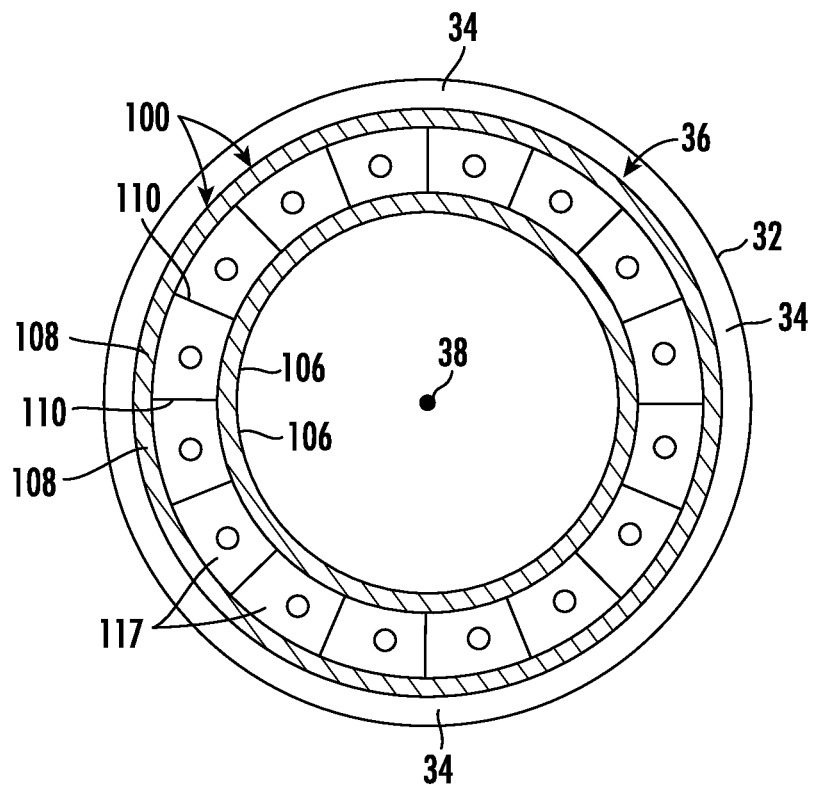
FIG. 2 is an upstream view of an exemplary combustion section of a turbomachine, in accordance with embodiments of the present disclosure.

FIG. 2 provides an upstream view of the combustion section 16, according to various embodiments of the present disclosure. As shown in FIG. 2, the combustion section 16 may be at least partially surrounded by an outer or compressor discharge casing 32. The compressor discharge casing 32 may at least partially define a high-pressure plenum 34 that at least partially surrounds various components of the combustor 16. The high-pressure plenum 34 may be in fluid communication with the compressor 14 (FIG. 1) so as to receive the compressed air 26 therefrom. In various embodiments, as shown in FIG. 2, the combustion section 16 includes a segmented annular combustion system 36 that includes a number of combustors or integrated combustor nozzles 100 arranged circumferentially around an axial centerline 38 of the gas turbine 10, which may be coincident with the gas turbine shaft 22.

Figure 3:
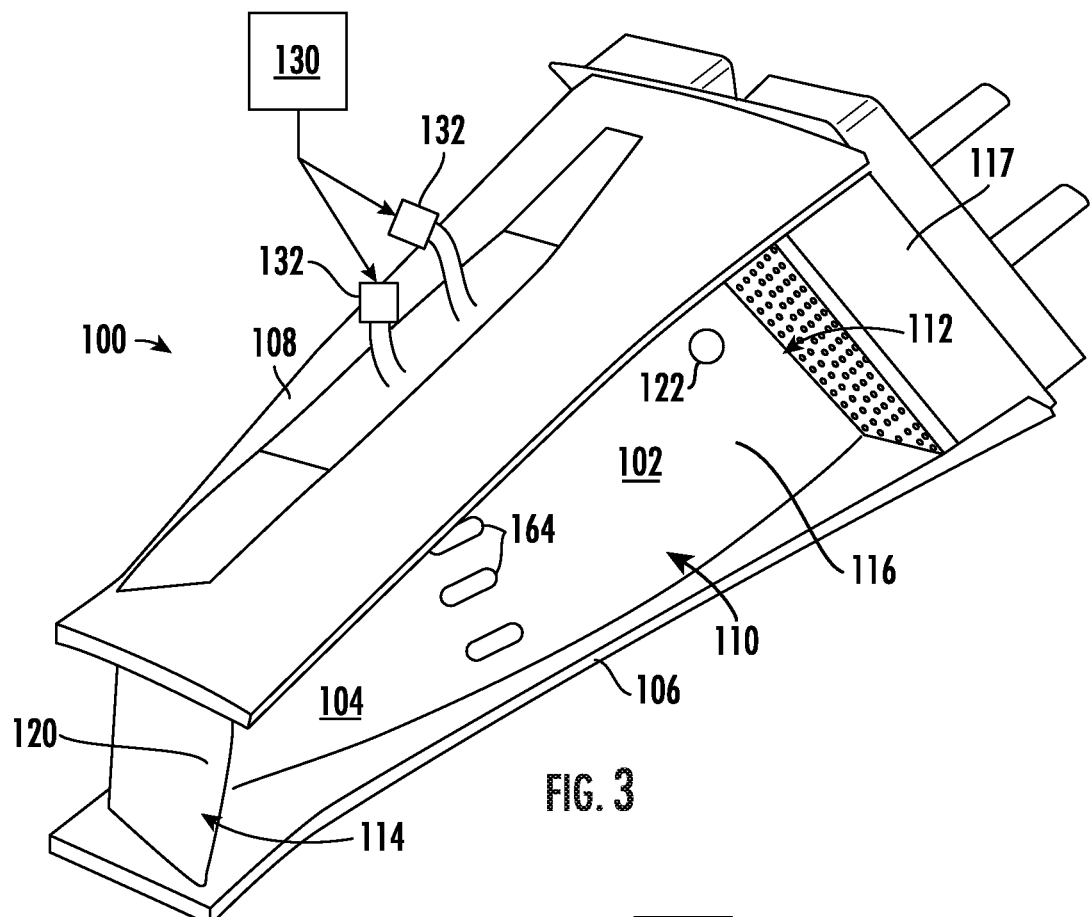
FIG. 3 is a perspective view of an integrated combustor nozzle, as viewed from a first side, in accordance with embodiments of the present disclosure.
Figure 4:
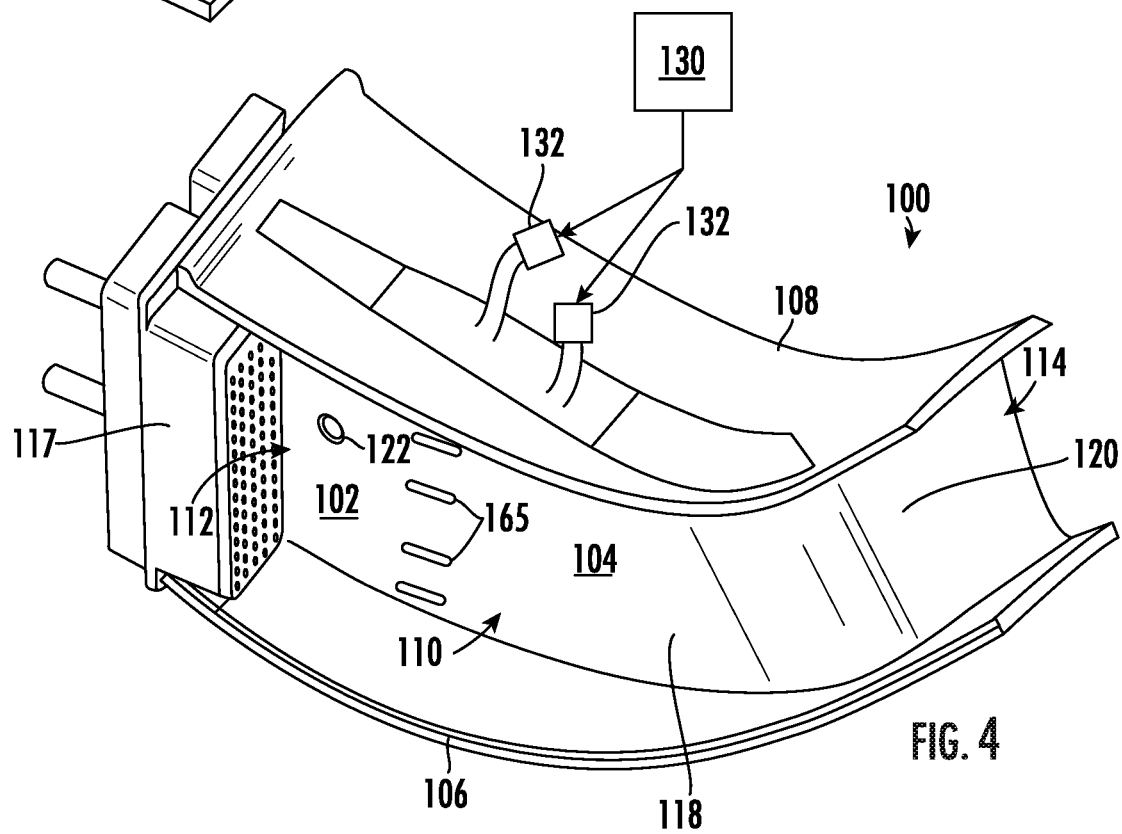
FIG. 4 is a perspective view of an integrated combustor nozzle, as viewed from a second side, in accordance with embodiments of the present disclosure.

FIG. 3 provides a perspective view of an integrated combustor nozzle 100, as viewed from a first side. Similarly, FIG. 4 provides a perspective view of an integrated combustor nozzle 100, as viewed from a second side, in accordance with embodiments of the present disclosure. As shown collectively in FIGS. 2, 3 and 4, the segmented annular combustion system 36 includes a plurality of integrated combustor nozzles 100. As described further herein, each combustor nozzle 100 includes a first side wall 116 and a second side wall 118. In particular embodiments, the first side wall is a pressure side wall, while the second side wall is a suction side wall, based on the integration of the side walls with corresponding pressure and suction sides of a downstream turbine nozzle 120. It should be understood that any references made herein to pressure side walls and suction side walls are representative of particular embodiments, such references being made to facilitate discussion, and that such references are not intended to limit the scope of any embodiment, unless specific context dictates otherwise.

As shown collectively in FIGS. 3 and 4, each circumferentially adjacent pair of combustor nozzles 100 defines a respective primary combustion zone 102 and a respective secondary combustion zone 104 therebetween, thereby forming an annular array of primary combustion zones 102 and secondary combustion zones 104. The primary combustion zones 102 and the secondary combustion zones 104 are circumferentially separated, or fluidly isolated, from adjacent primary combustion zones 102 and secondary combustion zones 104, respectively, by the combustion liners 110.

As shown collectively in FIGS. 3 and 4, each combustor nozzle 100 includes an inner liner segment 106, an outer liner segment 108, and a hollow or semi-hollow combustion liner 110 that extends between the inner liner segment 106 and the outer liner segment 108. It is contemplated that more than one (e.g., 2, 3, 4, or more) combustion liners 110 may be positioned between the inner liner segment 106 and the outer liner segment 108, thereby reducing the number of joints between adjacent liner segments that require sealing. For ease of discussion herein, reference will be made to integrated combustor nozzles 100 having a single combustion liner 110 between respective inner and outer liner segments 106, 108, although a 2:1 ratio of liner segments to combustion liners is not required. As shown in FIGS. 3 and 4, each combustion liner 110 includes forward or upstream end portion 112, an aft or downstream end portion 114, a first side wall 116, which is a pressure side wall in the particular example embodiment illustrated in FIG. 3 and a second side wall 118, which is a suction side wall in the particular example embodiment illustrated in FIG. 4.

The segmented annular combustion system 36 further includes a fuel injection module 117. In the illustrated example embodiment, the fuel injection module 117 includes a plurality of fuel nozzles. The fuel injection module 117 is configured for installation in the forward end portion 112 of a respective combustion liner 110. For purposes of illustration herein, the fuel injection module 117 including the plurality of fuel nozzles may be referred to as a "bundled tube fuel nozzle." However, the fuel injection module 117 may include or comprise any type of fuel nozzle or burner (such as a swirling fuel nozzle or swozzle), and the claims should be not limited to a bundled tube fuel nozzle unless specifically recited as such.

Each fuel injection module 117 may extend at least partially circumferentially between two circumferentially adjacent combustion liners 110 and/or at least partially radially between a respective inner liner segment 106 and outer liner segment 108 of the respective combustor nozzle 100. During axially staged fuel injection operation, the fuel injection module 117 provides a stream of premixed fuel and air (that is, a first combustible mixture) to the respective primary combustion zone 102.

In at least one embodiment, as shown in FIGS. 3 and 4, the downstream end portion 114 of one or more of the combustion liners 110 transitions into a generally airfoil-shaped turbine nozzle 120, which directs and accelerates the flow of combustion products toward the turbine blades. Thus, the downstream end portion 114 of each combustion liner 110 may be considered an airfoil without a leading edge. When the integrated combustor nozzles 100 are mounted within the combustion section 16, the turbine nozzle 120 may be positioned immediately upstream from a stage of turbine rotor blades of the turbine 18.

As used herein, the term "integrated combustor nozzle" refers to a seamless structure that includes the combustion liner 110, the turbine nozzle 120 downstream of the combustion liner, the inner liner segment 106 extending from the forward end 112 of the combustion liner 110 to the aft end 114 (embodied by the turbine nozzle 120), and the outer liner segment 108 extending from the forward end 112 of the combustion liner 110 to the aft end 114 (embodied by the turbine nozzle 120). In at least one embodiment, the turbine nozzle 120 of the integrated combustor nozzle 100 functions as a first-stage turbine nozzle and is positioned upstream from a first stage of turbine rotor blades.

As described above, one or more of the integrated combustor nozzles 100 is formed as an integral, or unitary, structure or body that includes the inner liner segment 106, the outer liner segment 108, the combustion liner 110, and the turbine nozzle 120. The integrated combustor nozzle 100 may be made as an integrated or seamless component, via casting, additive manufacturing (such as 3D printing), or other manufacturing techniques. By forming the combustor nozzle 100 as a unitary or integrated component, the need for seals between the various features of the combustor nozzle 100 may be reduced or eliminated, part count and costs may be reduced, and assembly steps may be simplified or eliminated. In other embodiments, the combustor nozzle 100 may be fabricated, such as by welding, or may be formed from different manufacturing techniques, where components made with one technique are joined to components made by the same or another technique.

In particular embodiments, at least a portion or all of each integrated combustor nozzle 100 may be formed from a ceramic matrix composite (CMC) or other composite material. In other embodiments, a portion or all of each integrated combustor nozzle 100 and, more specifically, the turbine nozzle 120 or its trailing edge, may be made from a material that is highly resistant to oxidation (e.g., coated with a thermal barrier coating) or may be coated with a material that is highly resistant to oxidation.

In another embodiment (not shown), at least one of the combustion liners 110 may taper to a trailing edge that is aligned with a longitudinal (axial) axis of the combustion liner 110. That is, the combustion liner 110 may not be integrated with a turbine nozzle 120. In these embodiments, it may be desirable to have an uneven count of combustion liners 110 and turbine nozzles 120. The tapered combustion liners 110 (i.e., those without integrated turbine nozzles 120) may be used in an alternating or some other pattern with combustion liners 110 having integrated turbine nozzles 120 (i.e., integrated combustor nozzles 100).

At least one of the combustion liners 110 may include at least one cross-fire tube 122 that extends through respective openings in the pressure side wall 116 and the suction side wall 118 of the respective combustion liner 110. The cross-fire tube 122 permits cross-fire and ignition of circumferentially adjacent primary combustion zones 102 between circumferentially adjacent integrated combustor nozzles 100.

In many embodiments, as shown in FIG. 3, each combustion liner 110 may include a plurality of radially spaced pressure side injection outlets 164 defined along the pressure side wall 116, through which the pressure side fuel injectors 202, 204 may extend. As shown in FIG. 4, each combustion liner 110 may include a plurality of radially spaced suction side injection outlets 165 defined along the suction side wall 118, through which the suction side fuel injectors 202, 204 may extend. Each respective primary combustion zone 102 is defined upstream from the corresponding pressure side injection outlets 164 and/or suction side injection outlets 165 of a pair of circumferentially adjacent integrated combustor nozzles 100. Each secondary combustion zone 104 is defined downstream from the corresponding pressure side injection outlets 164 and/or suction side injection outlets 165 of the pair of circumferentially adjacent integrated combustor nozzles 100. Although the plurality of pressure side injection outlets 164 are shown in FIG. 2 as residing in a common radial or injection plane with respect to an axial centerline of the integrated combustor nozzle 100 or at a common axial distance from the downstream end portion 114 of the fuel injection panel 110, in particular embodiments, one or more of the pressure side injection outlets 164 may be staggered axially with respect to radially adjacent pressure side injection outlets 164, thereby off-setting the axial distances of the pressure side injection outlets 164 to the downstream end portion 114 for particular pressure side injection outlets 164. Similarly, although FIG. 4 illustrates the plurality of suction side injection outlets 165 in a common radial or injection plane or at a common axial distance from the downstream end portion 114 of the fuel injection panel 110, in particular embodiments, one or more of the suction side injection outlets 165 may be staggered axially with respect to radially adjacent suction side injection outlets 165, thereby off-setting the axial distances of the pressure side injection outlets 165 to the downstream end portion 114 for particular suction side injection outlets 165.

Figure 5:
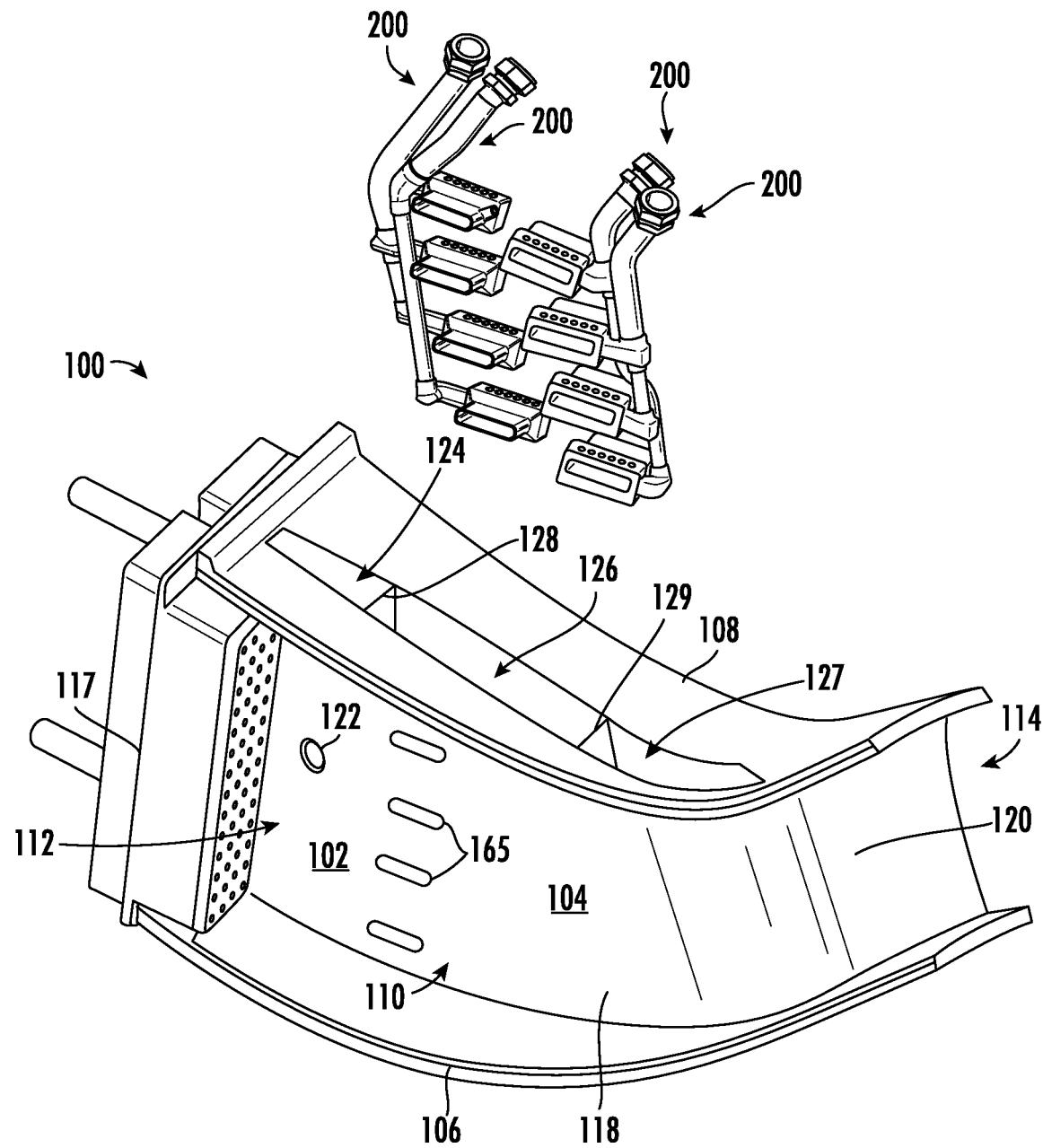
FIG. 5 is a perspective view of an integrated combustor nozzle, which is shown having four fuel injection assemblies exploded away, in accordance with embodiments of the present disclosure.

FIG. 5 illustrates a perspective view of an integrated combustor nozzle 100, which is shown having four fuel injection assemblies 200 exploded away, in accordance with embodiments of the present disclosure. As shown, the integrated combustor nozzle 100 includes two fuel injection assemblies 200 oriented to inject a mixture of fuel and air to the pressure side of the integrated combustion nozzle 100, and two fuel injection assemblies 200 that are oriented to inject a mixture of fuel and air to the suction side of the integrated combustor nozzle 100.

In many embodiments, an interior portion of each combustion liner 110 may be defined between the pressure side wall 116 and the suction side wall 118 and may be partitioned into various air passages or cavities 124, 126, 127 by one or more ribs 128, 129. In particular embodiments, the air cavities 124, 126 may receive air from the compressor discharge casing 32 or other cooling source. The ribs or partitions 128, 129 may extend within the interior portion of the combustion liner 110 to at least partially form or separate the plurality of air cavities 124, 126, 127. In particular embodiments, some or all of the ribs 128, 129 may provide structural support to the pressure side wall 116 and/or the suction side wall 118 of the combustion liner 110.

In particular embodiments, each of the four fuel injection assemblies 200 may be positioned within the center air cavity 126, e.g., between the forward air cavity 124 and the aft air cavity 127. Each of the fuel injector assemblies 200 may be in fluid communication with both the high pressure plenum 34 and a fuel supply 130, in order to provide a secondary fuel air mixture to the secondary combustion zone 104. The fuel supply 130 may be fluidly coupled each of the fuel injection assemblies 200 via a conduit fitting 132. The conduit fittings 132 may mechanically fasten each of the fuel injection assemblies to the fuel supply 130.

Figure 6:
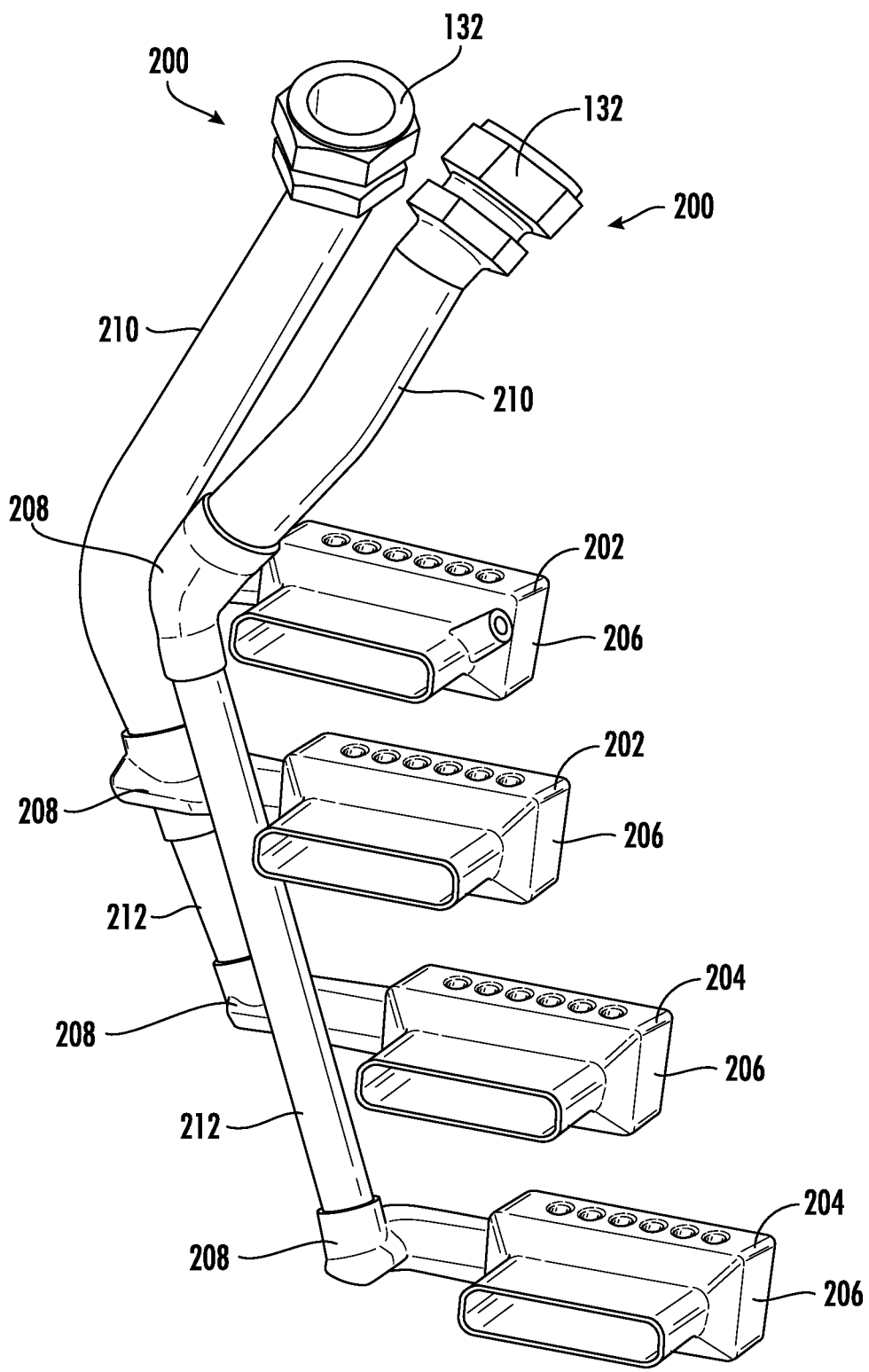
FIG. 6 is a perspective view of two fuel injection assemblies, in accordance with embodiments of the present disclosure.

FIG. 6 illustrates two fuel injection assemblies 200 isolated from the various other components of the integrated combustor nozzle 100. In various embodiment, the fuel injection assembly 200 shown in FIG. 6 may be either a suction side fuel injection assembly or a pressure side fuel injection assembly, i.e. may be operable to deliver to a secondary mixture of fuel and air through either the pressure side wall 116 or the suction side wall 118 to a secondary combustion zone 104. In many embodiments, as shown, each fuel injection assembly 200 may include a first fuel injector or upstream fuel injector 202 and a second fuel injector or downstream fuel injector 204, with respect to the direction of fuel flow through the fuel injection assembly 200. In particular embodiments, each of the fuel injector assemblies 200 may further include a fluid As shown in FIG. 6, each of the fuel injectors 202, 204 include a main body 206 and a fuel duct 208 that extends from the main body 206. In many embodiments, the fuel duct 208 of the upstream fuel injector 202 may couple to both a fluid supply conduit 210 and a connection conduit 212. The fluid supply conduit 210 may extend between the conduit fitting 132 and the fuel duct 208 of the upstream fuel injector 202, such that it fluidly couples the upstream fuel injector 202 to the fuel supply 130. In various embodiments, the connection conduit 212 may couple the fuel duct 208 of the upstream fuel injector 202 to the fuel duct of the downstream fuel injector 204. Although the embodiment shown in FIG. 6 includes fuel injection assemblies having two fuel injectors 202, 204 fluidly coupled via the connection conduit 212, other embodiments may include three, four, five, six, or more fuel injectors coupled to one another via multiple connection conduits.

Figure 8:
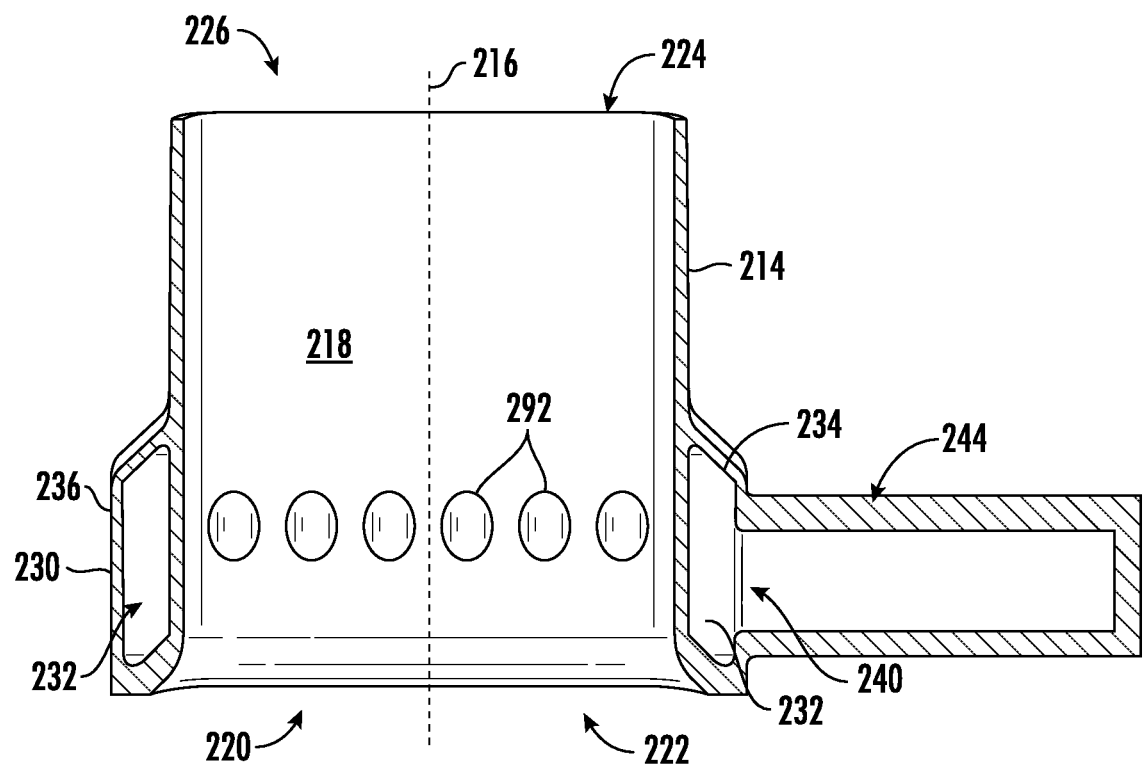
FIG. 8 illustrates a cross-sectional view of the fuel injector, in accordance with embodiments of the present disclosure.

FIG. 7 illustrates an enlarged perspective view of a fuel injection assembly 200 and FIGS. 8-10 illustrate different cross-sectional views of the fuel injectors 202, 204, in accordance with embodiments of the present disclosure. As shown in FIGS. 7-10 collectively, the main body 206 of each of the fuel injectors 202, 204 includes a first annular wall 214 that extends about an axial centerline 216 of the fuel injector 202, 204 (FIGS. 9 and 10). In many embodiments, the first annular wall 214 of the fuel injector 202, 204 extends axially, e.g. along the axial centerline 216, from a primary inlet 220 disposed at a first end 222 to a primary outlet 224 disposed at a second end 226. For example, the first annular wall 214 may define a premix passage 218 shaped as a geometric stadium, e.g. a rectangle having rounded ends, which advantageously allows the fuel injector 202, 204 to deliver the fuel air mixture over a larger axial distance with respect to the axial centerline of the gas turbine 10. As shown, the primary outlet 224 of the first injector 202 and the primary outlet 224 of the second injector 204 are disposed on the first side wall 116 of the combustion liner 110. In exemplary embodiments, the first annular wall 214 of each fuel injector 202, 204 may extend through a respective injection outlet 164, 165 defined within one of the pressure side wall 116 or the suction side wall 118 of the combustion liner 110, in order to provide a mixture of fuel and air to the secondary combustion zone 104.

In many embodiments, a second annular wall 230 may be spaced apart and surround the first annular wall 214 of the fuel injector 202, 204, such that a fuel plenum 232 is defined therebetween. For example, the fuel plenum 232 may be defined annularly between the first annular wall 214 and the second annular wall 230, such that it extends about the interior surfaces of the fuel injector 202, 204. The second annular wall 230 may include a first end wall 234, a second end wall 236 spaced apart from the first end wall 234, and side walls 238 may extend between the first end wall 234 and the second end wall 234. In various embodiments, the first end wall 234 and the second end wall 236 may be generally perpendicular to the side walls 238, such that the second annular wall 230 has a rectangular cross-sectional shape. For example, as shown in FIGS. 9 and 10, the side walls 238 may extend generally parallel to one another and may be longer than the first end wall 234 and the second end wall 236.

In many embodiments, as shown in FIG. 8, the first annular wall 214 and second annular 230 wall may be coupled to one another at opposite ends, in order to define the forward and aft boundary of the fuel plenum with respect to the direction of fuel and air within the fuel injector 202. For example, at the first end of the fuel injector 202, the first annular wall 214 may converge towards, and couple to, the second annular wall 230, such that the forward boundary of the fuel plenum 232 is defined at the intersection of the two walls 214 and 230. In other words, the first annular wall 214 may diverge away from the axial centerline 216 of the fuel injector 202 and couple to the second annular wall 230 at first end of the fuel injector 202. Similarly, between the first end and the second end of the fuel injector 202, the second annular wall 230 may converge towards, and couple to, the first annular wall 214, such that the aft boundary of the fuel plenum 232 is defined at the intersection of the two walls 214 and 230. In other words, the second annular wall 230 may converge towards the axial centerline 216 of the fuel injector 202 and couple to the first annular wall 214 between the first end and the second end of the fuel injector 202.

In various embodiments, as shown in FIGS. 7-10 collectively, a plurality of secondary conduits 288 may each extend from a secondary inlet 290 defined on the second annular wall 230, through the fuel plenum 232, to a secondary outlet 292 defined on the first annular wall 214. More specifically, plurality of secondary conduits 288 may each extend from a secondary inlet 290 defined on one of the side walls 238 of the second annular wall 230, through the fuel plenum 232, to a secondary outlet 292 defined on the first annular wall 214. As shown in FIG. 9, each secondary conduit 288 of the plurality of secondary conduits 288 may define one or more fuel ports 294 in fluid communication with the fuel plenum 232. In this way, each of the secondary conduits 288 may provide an individual flow of fuel and air to the premix passage 218 for mixing prior to introduction to the secondary combustion zone 104.

In many embodiments, as shown in FIG. 7-10 collectively, the fuel duct 208 may extend from a fuel outlet 240 defined in the second annular wall 230 to a fuel inlet 242. In various embodiments, the fuel duct 208 may extend away from the second annular wall 230 of the main body 206 of the fuel injector 202, 204. More specifically, the fuel duct 208 may extend generally perpendicularly to the first end wall of the second annular wall of the main body 206. In exemplary embodiments, the fuel duct 208 may be in fluid communication with both the fuel supply 130 and the fuel plenum 232.

As shown in FIGS. 7-10 fuel duct 208 of the upstream fuel injector 202 and the downstream fuel injector 204 may include a polygonal segment 244 and a cylindrical inlet segment 246. In exemplary embodiments, the polygonal segment 244 may extend from the fuel outlet 240 to the cylindrical inlet segment 246, and the cylindrical inlet segment 246 may extend from the polygonal segment 244 to the fuel inlet 242 of the fuel duct 208. The polygonal segment 244 may have a cross section that is shaped as a polygon having at least three straight sides that extend, and form angles, between one another, which advantageously allows the fuel duct to be additively manufactured with minimal or no temporary supports, thereby reducing production time and production cost.

In many embodiments, the upstream fuel injector 202 may include a cylindrical outlet segment 268 disposed oppositely the cylindrical inlet segment 246. In this way, the fuel duct 208 of the upstream fuel injectors 202 acts as a junction for the fuel received by the fuel supply 130. For example, fuel received by the fuel duct 208 of the upstream fuel injector 202 may be divided between the polygonal segment of the fuel duct and the cylindrical outlet segment 268 for use in another fuel injector, such as the downstream fuel injector 204.

As shown best in FIG. 9, the cylindrical inlet segment 246 may include a diameter 284 that is larger than a diameter 286 of the cylindrical inlet segment 268, which may advantageously ensure that enough fuel is divided between the polygonal segment 244 of the upstream fuel injector 202 and the cylindrical outlet segment 268 for use in the downstream fuel injector 204.

In exemplary embodiments, the fluid supply conduit 210 may fluidly couple the cylindrical inlet segment 246 of the upstream fuel injector 202 to a fuel supply 130. A connection conduit 212 may fluidly couple the cylindrical outlet section 268 of the upstream fuel injector 202 to the cylindrical inlet segment 246 of the downstream fuel injector 204. As shown in FIG. 6, the connection conduit 212 may be a generally straight tube/pipe that is shaped as a hollow cylinder, which advantageously reduces production time and cost of the fuel injection assembly 200 by not requiring any special fabrication and/or bending to the connection conduit 212.

In many embodiments, both the cylindrical inlet segment 246 and the cylindrical outlet segment 268 may be shaped as hollow cylinders that extend generally straight, i.e. with no bends and/or curves. Unlike the polygonal segment 244 of the fuel duct 208, the cylindrical segments 246, 268 may require one or more temporary supports during the additive manufacturing process in order to produce the geometry. However, because the cylindrical segments 246, 268 extend straight, i.e., without any bends or curves, the temporary supports may be removed using a cost-effective traditional removal means, such as a drilling or milling process. In addition, the cylindrical segments 246 allow for coupling to traditional tubing/piping, instead of, e.g., specialized piping, which reduces the overall cost of the fuel injection assembly 200. For example, the connection conduit 212 may be a generally straight tube/pipe that does not require any bending or fabricating, which therefore reduces the overall production time and production cost of the fuel injection assembly 200.

For example, FIGS. 11-17 each illustrate a cross section of the polygonal segment 244 of the fuel duct 208, in accordance with embodiments of the present disclosure. As shown, the polygonal segment 244 of the fuel duct 208 may include a centerline 248, which extends through the center of the cross section and is generally parallel to the axial centerline 216 of the fuel injector 202, 204. In various embodiments, the centerline 248 may be generally parallel to one or both of the side walls 252, 254 In many embodiments, the polygonal segment 244 of the fuel duct 208 may include at least one sloped end wall 250, which is sloped or angled with respect to the centerline 248 of the polygonal segment 244.

For example, in some embodiments, the sloped end wall 250 may form an angle 256 with the centerline 248 of the polygonal segment 244 that is between about 10° and about 80°. In other embodiments, the sloped end wall 250 may form an angle 256 with the centerline 248 of the polygonal segment 244 that is between about 20° and about 70°. In various embodiments, the sloped end wall 250 may form an angle 256 with the centerline 248 of the polygonal segment 244 that is between about 30° and about 60°. In particular embodiments, the sloped end wall 250 may form an angle 256 with the centerline 248 of the polygonal segment 244 that is between about 40° and about 50°. The angle 256 of the sloped end wall 250 advantageously allows the polygonal segment 244 of the fuel duct 208 to be fabricated using an additive manufacturing process with minimal or no temporary supports. For example, since the structure of the polygonal segment 208 does not require temporary supports and/or additional structure to be additively manufactured, it does not require any post machining to remove such supports, thereby saving both production time and cost.

In many embodiments, the polygonal segment 244 of the fuel duct 208 may include a perpendicular end wall 266, a first side wall 252, and a second side wall 254. In the embodiments shown in FIG. 11-12, the perpendicular end wall 266 may be axially spaced apart from the one or more sloped end walls 250 with respect to the centerline 248 of the polygonal segment. In such embodiments, the perpendicular end wall 266 may extend between the first side wall 252 and the second side wall 254. In exemplary embodiments, the perpendicular end wall 266 may be generally perpendicular to both of the side walls 252, 254 and the centerline 248 of the polygonal segment 244.

Figure 11:
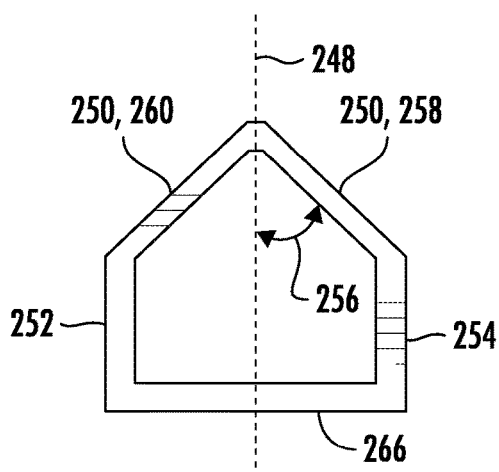
FIG. 11 illustrates a cross-section of a polygonal segment of a fuel duct of a fuel injector, in accordance with embodiments of the present disclosure.
Figure 12:
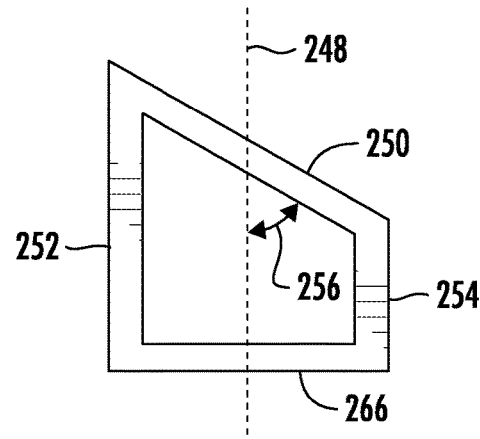
FIG. 12 illustrates a cross-section of a polygonal segment of a fuel duct of a fuel injector, in accordance with embodiments of the present disclosure.
Figure 13:
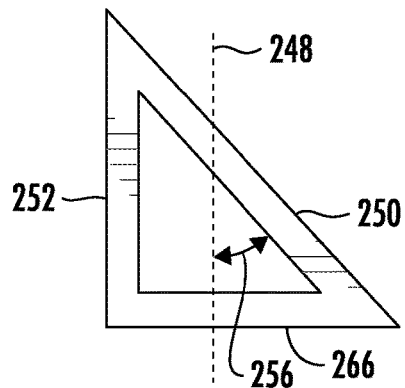
FIG. 13 illustrates a cross-section of a polygonal segment of a fuel duct of a fuel injector, in accordance with embodiments of the present disclosure.
Figure 16:
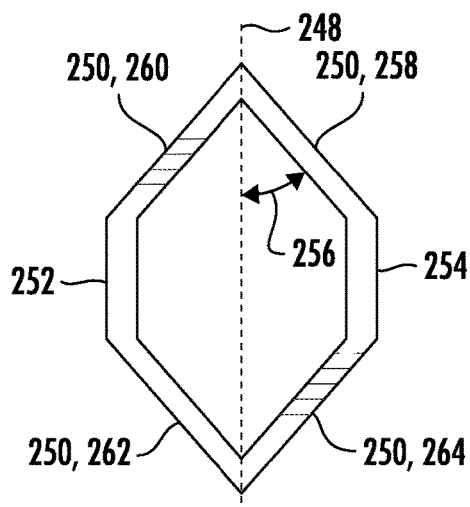
FIG. 16 illustrates a cross-section of a polygonal segment of a fuel duct of a fuel injector, in accordance with embodiments of the present disclosure.

In various embodiments, as shown in FIGS. 11, 12 and 16, the first side wall 252 and the second side wall 254 may extend between the perpendicular end wall 266 and the sloped end walls 250. In other embodiments, as shown in FIG. 13, the polygonal segment 244 may only include one side wall 252 that extends directly between the perpendicular end wall 266 and the sloped end wall 250. Yet still in other embodiments, as shown in FIG. 14, the polygonal segment 244 may not include any side walls whatsoever, such that the perpendicular wall 266 may extend directly between a first sloped wall 258 and a second sloped wall 260.

Figure 14:
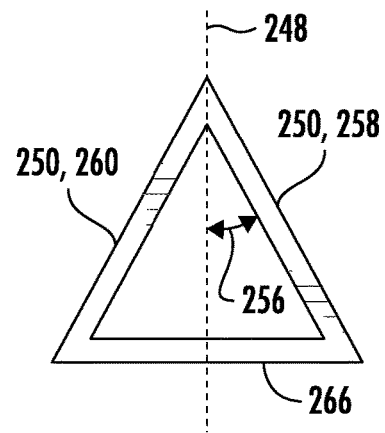
FIG. 14 illustrates a cross-section of a polygonal segment of a fuel duct of a fuel injector, in accordance with embodiments of the present disclosure.
Figure 15:
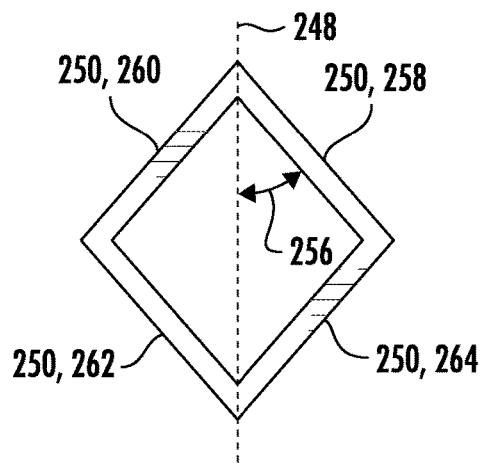
FIG. 15 illustrates a cross-section of a polygonal segment of a fuel duct of a fuel injector, in accordance with embodiments of the present disclosure.

In many embodiments, as shown in FIGS. 11 and 14, sloped end wall 250 may be a first sloped end wall 258, and the polygonal segment of the fuel duct may further include a second sloped end wall 260 that is oppositely disposed from the first sloped end wall 258. In other embodiments, as shown in FIGS. 15 and 16, the polygonal segment 244 may include a third sloped end wall 262 and a fourth sloped end wall 264, such that there is no perpendicular end wall whatsoever.

Figure 17:
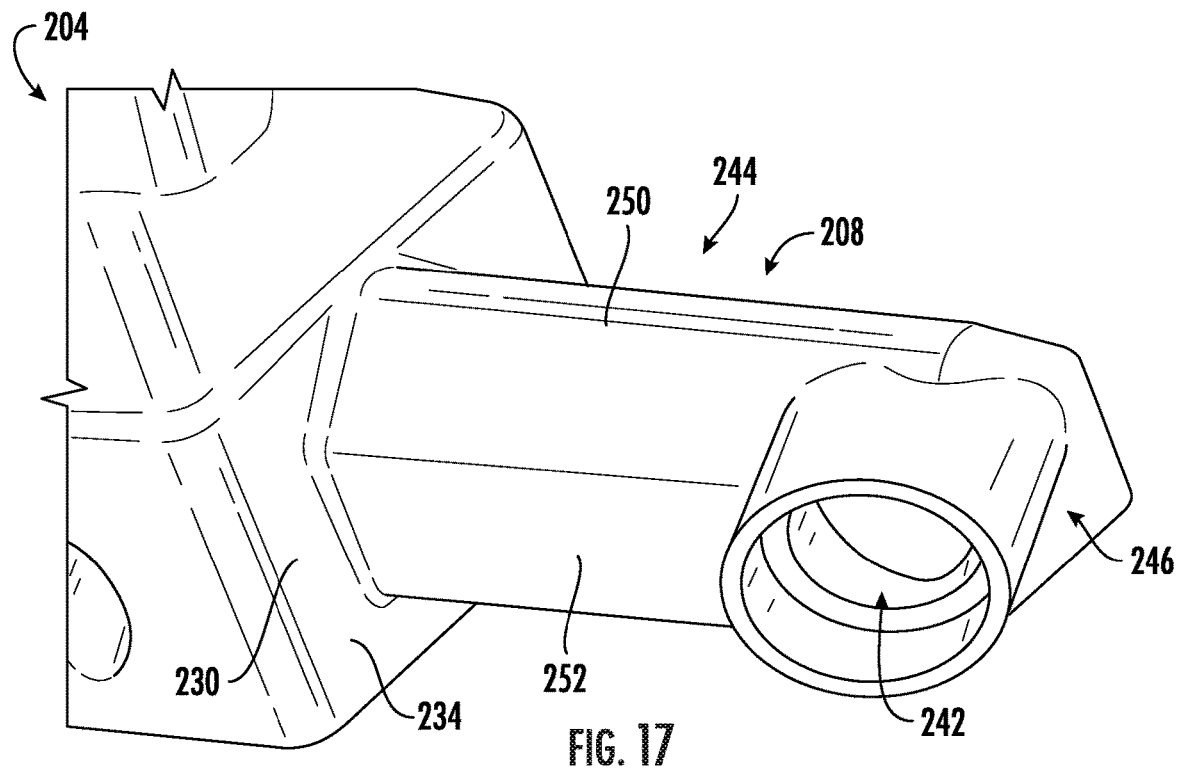
FIG. 17 illustrates an enlarged perspective view of a fuel duct of a downstream fuel injector, in accordance with embodiments of the present disclosure.
Figure 18:
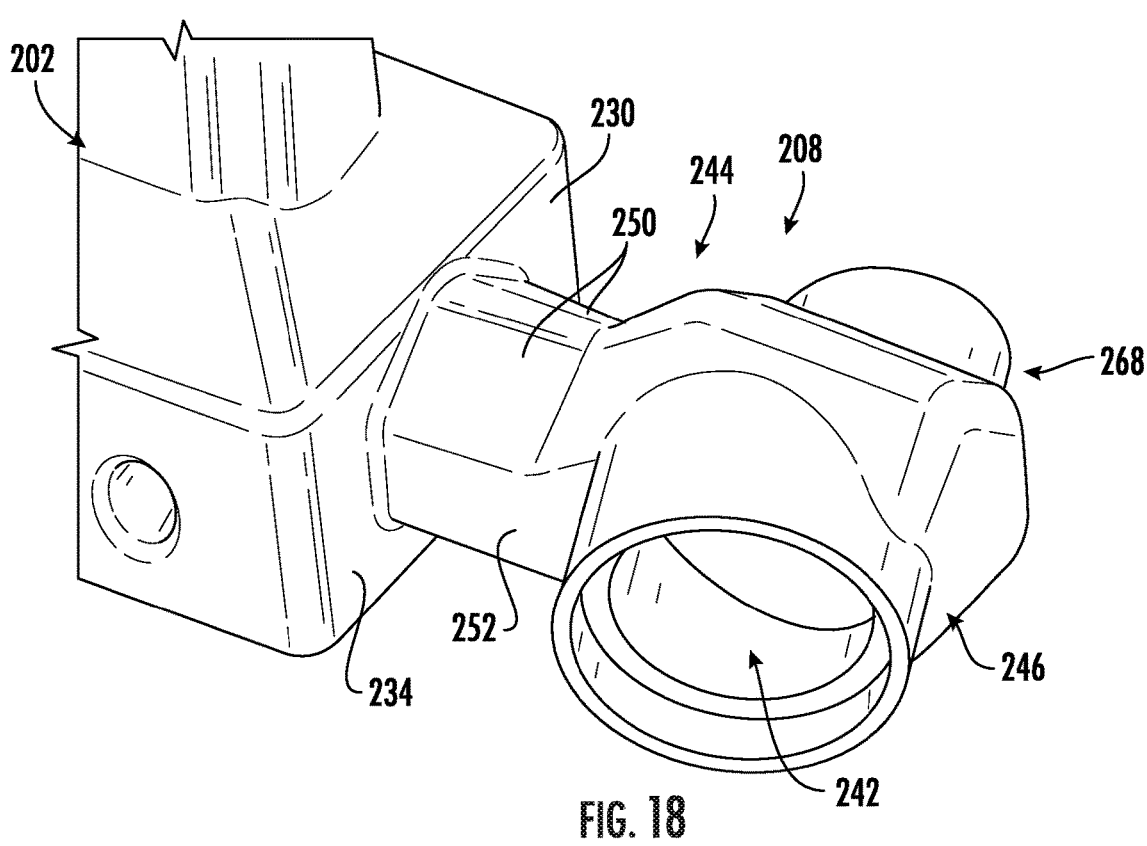
FIG. 18 illustrates an enlarged perspective view of a fuel duct of an upstream fuel injector, in accordance with embodiments of the present disclosure.

FIG. 17 illustrates an enlarged perspective view of a fuel duct 208 of a downstream fuel injector 204, and FIG. 18 illustrates an enlarged perspective view of a fuel duct 208 of an upstream fuel injector 202. As shown in FIGS. 17 and 18, each of the fuel ducts 208 of the fuel injectors 202, 204 may seamlessly transition between the polygonal segment 244 and the cylindrical segments 246, 268. For example, the fuel duct 208 may transition between the polygonal segment 244 and the cylindrical segments 246, 268, such that the entire fuel duct 208 is a single piece of continuous metal. In this way, the fuel duct 208 may advantageously include fewer sub-components and may advantageously contain no joints. In addition, the fuel duct 208 having a seamless transition advantageously prevents leakage and increases overall performance.

Figure 19:
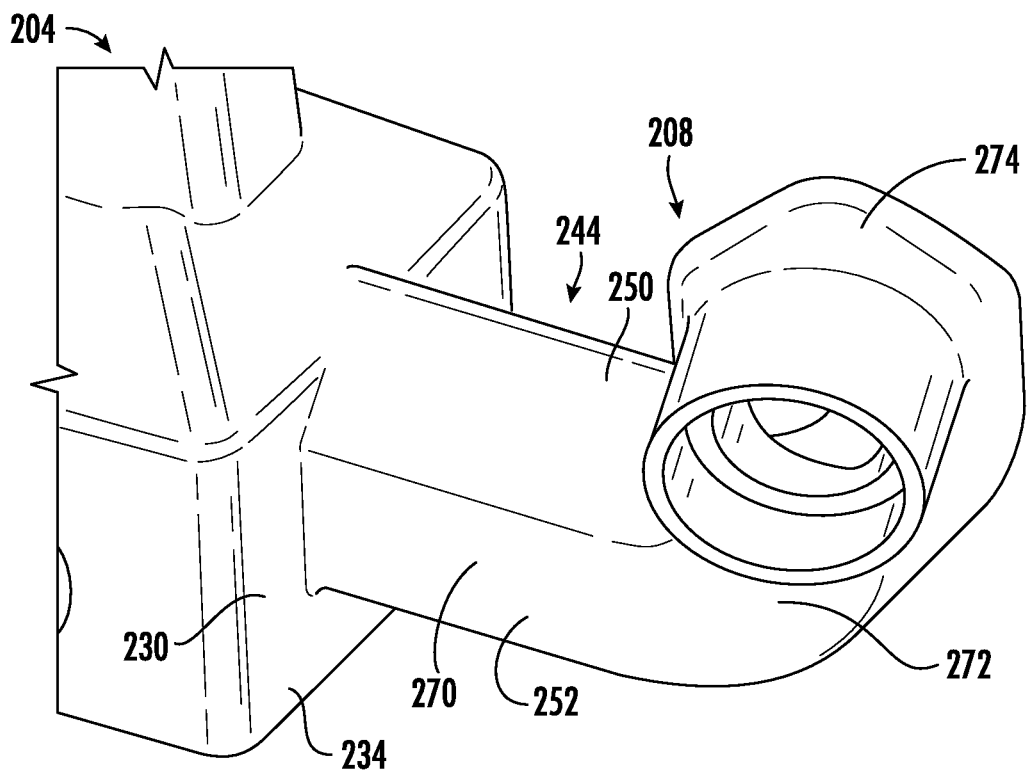
FIG. 19 illustrates an enlarged perspective view of a fuel duct of a downstream fuel injector, in accordance with embodiments of the present disclosure.
Figure 20:
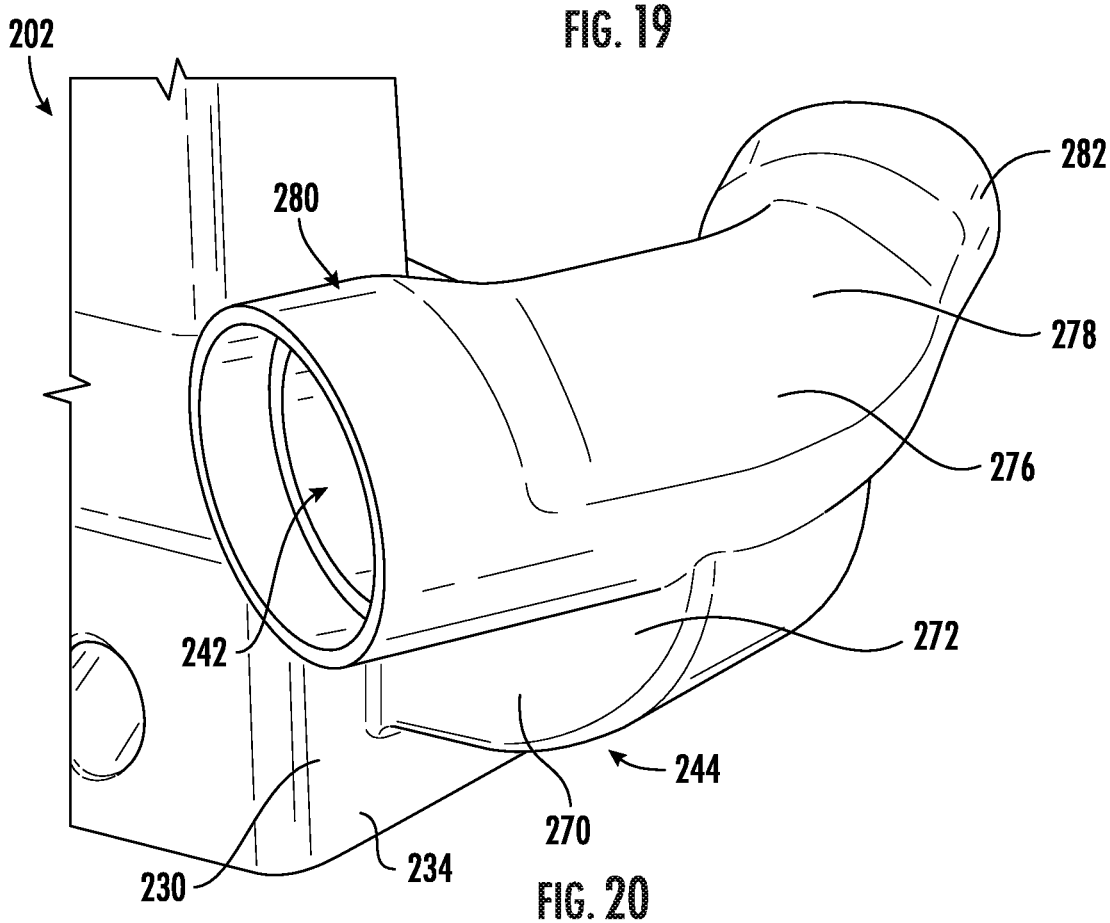
FIG. 20 illustrates an enlarged perspective view of a fuel duct of an upstream fuel injector, in accordance with embodiments of the present disclosure.

FIG. 19 illustrates an enlarged perspective view of an alternative embodiment of a fuel duct 208 for a downstream fuel injector 204, and FIG. 20 illustrates an enlarged perspective view of an alternative embodiment of a fuel duct 208 for an upstream fuel injector 202. As shown in FIGS. 19 and 20, in some embodiments, the polygonal segment 244 of the fuel duct 208 may include a first portion 270 and a second portion 272 extending continuously between one another. The first portion may extend generally perpendicularly away from the main body 206, and the second portion that curves and extends towards the primary outlet 224 of the fuel injector 202. In this way, the second portion 272 of the polygonal segment 244 may extend axially with respect to the axial centerline 248 of the fuel injector 202, 204 beyond where the second annular wall 230 is coupled to the first annular wall 214. In many embodiments, as shown in FIG. 19, the fuel duct 208 of the upstream fuel injector 202 may include a conical ceiling 274, which advantageously allows the fuel duct 208 to be additively manufactured with minimal or no temporary supports, thereby reducing production time and production cost.

As shown in FIG. 20, in some embodiments, the fuel duct 208 may include a transition piece 276 that extends from the polygonal segment 244 of the fuel duct 208. More specifically, the transition piece 276 may extend from the second portion 272 of the polygonal segment 244 of the fuel duct 208. The transition piece 276 may include a tapered ceiling portion 278 that extends between a cylindrical inlet segment 280 and a cylindrical outlet segment 282. The tapered ceiling portion 278 may advantageously be additively manufactured having no temporary support structure, which reduces the overall production time and associated costs with producing the fuel injector 204.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A fuel injection assembly, comprising:
   a fuel injector having a main body and a fuel duct, wherein the main body comprises:
   a first annular wall extending about an axial centerline and extending from a primary inlet disposed at a first end to a primary outlet disposed at a second end;
   a second annular wall surrounding the first annular wall; and
   a fuel plenum defined between the first annular wall and the second annular wall;
   wherein the fuel duct extends from a fuel inlet to a fuel outlet defined in the second annular wall, wherein the fuel outlet is in fluid communication with the fuel plenum, and wherein the fuel duct comprises a polygonal segment and a cylindrical inlet segment, the polygonal segment extending from the fuel outlet to the cylindrical inlet segment, the polygonal segment of the fuel duct comprises a first sloped end wall and a second sloped end wall with respect to a centerline of the polygonal segment, the second sloped end wall extending from the first sloped end wall, wherein the centerline of the polygonal segment is perpendicular to a flow direction of fluid through the fuel duct;
   wherein the second sloped end wall is oppositely disposed from, and coupled to, the first sloped end wall, and
   wherein the polygonal segment of the fuel duct further comprises a first side wall, a second side wall, and an end wall perpendicular to the first side wall, the second side wall, and the centerline of the polygonal segment, wherein the first sloped end wall extends from the first side wall to the second sloped end wall, wherein the second sloped end wall extends from the second side wall to the first sloped end wall, wherein the sloped end walls are oblique to each of the first side wall, the second side wall, and the centerline, wherein the end wall is axially spaced apart from the sloped end walls with respect to the centerline of the polygonal segment of the fuel duct, and wherein the first side wall and the second side wall extend between the end wall and the sloped end walls.

2. The fuel injection assembly as in claim 1, wherein the fuel duct seamlessly transitions from the polygonal segment to the cylindrical inlet segment at a transition zone.

3. The fuel injection assembly as in claim 1, wherein the second annular wall comprises a first end wall, a second end wall spaced apart from the first end wall, and side walls that extend between the first end wall and the second end wall, and wherein the fuel duct extends from the first end wall.

4. The fuel injection assembly as in claim 1, wherein the fuel injector is a first fuel injector, wherein the fuel duct of the first fuel injector includes a cylindrical outlet segment, wherein a fluid supply conduit fluidly couples the cylindrical inlet segment of the first fuel injector to a fuel supply, and wherein a connection conduit fluidly couples the cylindrical outlet segment of the first fuel injector to a cylindrical inlet segment of a second fuel injector.

5. The fuel injection assembly as in claim 4, wherein the connection conduit is shaped as a straight hollow cylinder.

6. The fuel injection assembly as in claim 1, wherein the fuel injector is a first fuel injector, and wherein the fuel injection assembly further comprises a second fuel injector coupled to the first fuel injector via a connection conduit, the second fuel injector having a main body and a fuel duct, the main body of the second fuel injector comprising a first annular wall extending about an axial centerline and extending from a primary inlet disposed at a first end to a primary outlet disposed at a second end, a second annular wall surrounding the first annular wall of the second fuel injector, wherein a fuel plenum is defined between the first annular wall of the second fuel injector and the second annular wall of the second fuel injector, the fuel duct of the second fuel injector extending from a fuel outlet defined in the second annular wall of the second fuel injector to a fuel inlet, wherein the fuel duct of the second fuel injector is in fluid communication with the fuel plenum of the second fuel injector, the fuel duct of the second fuel injector comprising a polygonal segment and a cylindrical inlet segment, the polygonal segment of the second fuel injector extending from the fuel outlet of the second fuel injector to the cylindrical inlet segment of the second fuel injector.

7. A combustor, comprising:
a primary fuel nozzle;
a combustion liner extending radially between an inner liner segment and an outer liner segment, the combustion liner including a forward end portion, an aft end portion, a first side wall, and a second side wall, the combustion liner defining a cavity extending between the first side wall and the second side wall; and
a fuel injection assembly positioned downstream from the primary fuel nozzle, the fuel injection assembly including a fuel injector, the fuel injector comprising:
a main body having a first annular wall extending about an axial centerline and extending from a primary inlet disposed at a first end to a primary outlet disposed at a second end, a second annular wall surrounding the first annular wall, wherein a fuel plenum is defined between the first annular wall and the second annular wall; and
a fuel duct extending from a fuel inlet to a fuel outlet defined in the second annular wall, wherein the fuel outlet is in fluid communication with the fuel plenum, the fuel duct comprising a polygonal segment and a cylindrical inlet segment, the polygonal segment extending from the fuel outlet to the cylindrical inlet segment, the polygonal segment of the fuel duct comprises a first sloped end wall and a second sloped end wall with respect to a centerline of the polygonal segment, the second sloped end wall extending from the first sloped end wall, wherein the centerline of the polygonal segment is perpendicular to a flow direction of fluid through the fuel duct;
wherein the second sloped end wall is oppositely disposed from, and coupled to, the first sloped end wall, and
wherein the polygonal segment of the fuel duct further comprises a first side wall, a second side wall, and an end wall perpendicular to the first side wall, the second side wall, and the centerline of the polygonal segment, wherein the first sloped end wall extends from the first side wall to the second sloped end wall, wherein the second sloped end wall extends from the second side wall to the first sloped end wall, wherein the sloped end walls are oblique to each of the first side wall, the second side wall, and the centerline, wherein the end wall is axially spaced apart from the sloped end walls with respect to the centerline of the polygonal segment of the fuel duct, and wherein the first side wall and the second side wall extend between the end wall and the sloped end walls.

8. The combustor as in claim 7, wherein the fuel duct seamlessly transitions from the polygonal segment to the cylindrical inlet segment at a transition zone.

9. The combustor as in claim 7, wherein the second annular wall comprises a first end wall, a second end wall spaced apart from the first end wall, side walls that extend between the first end wall and the second end wall, and wherein the fuel duct extends from the first end wall.

10. The combustor as in claim 7, wherein the fuel injector is a first fuel injector, wherein the fuel duct of the first fuel injector includes a cylindrical outlet segment, wherein a fluid supply conduit fluidly couples the cylindrical inlet segment of the first fuel injector to a fuel supply, and wherein a connection conduit fluidly couples the cylindrical outlet segment of the first fuel injector to a cylindrical inlet segment of a second fuel injector.

11. The combustor as in claim 10, wherein the connection conduit is shaped as a straight hollow cylinder.

12. The combustor as in claim 7, wherein the fuel injector is a first fuel injector, and wherein the fuel injection assembly further comprises a second fuel injector coupled to the first fuel injector via a connection conduit, the second fuel injector having a main body and a fuel duct, the main body of the second fuel injector comprising a first annular wall extending about an axial centerline and extending from a primary inlet disposed at a first end to a primary outlet disposed at a second end, a second annular wall surrounding the first annular wall of the second fuel injector, wherein a fuel plenum is defined between the first annular wall of the second fuel injector and the second annular wall of the second fuel injector, the fuel duct of the second fuel injector extending from a fuel outlet defined in the second annular wall of the second fuel injector to a fuel inlet, wherein the fuel duct of the second fuel injector is in fluid communication with the fuel plenum of the second fuel injector, the fuel duct of the second fuel injector comprising a polygonal segment and a cylindrical inlet segment, the polygonal segment of the second fuel injector extending from the fuel outlet of the second fuel injector to the cylindrical inlet segment of the second fuel injector.

13. The combustor as in claim 12, wherein the primary outlet of the first injector and the primary outlet of the second injector are disposed on the first side wall of the combustion liner.

* * * * *